Jan. 11, 1966  P. K. TRIMBLE  3,228,251
UNBALANCE MEASURING SYSTEM
Filed Nov. 5, 1962  4 Sheets-Sheet 4

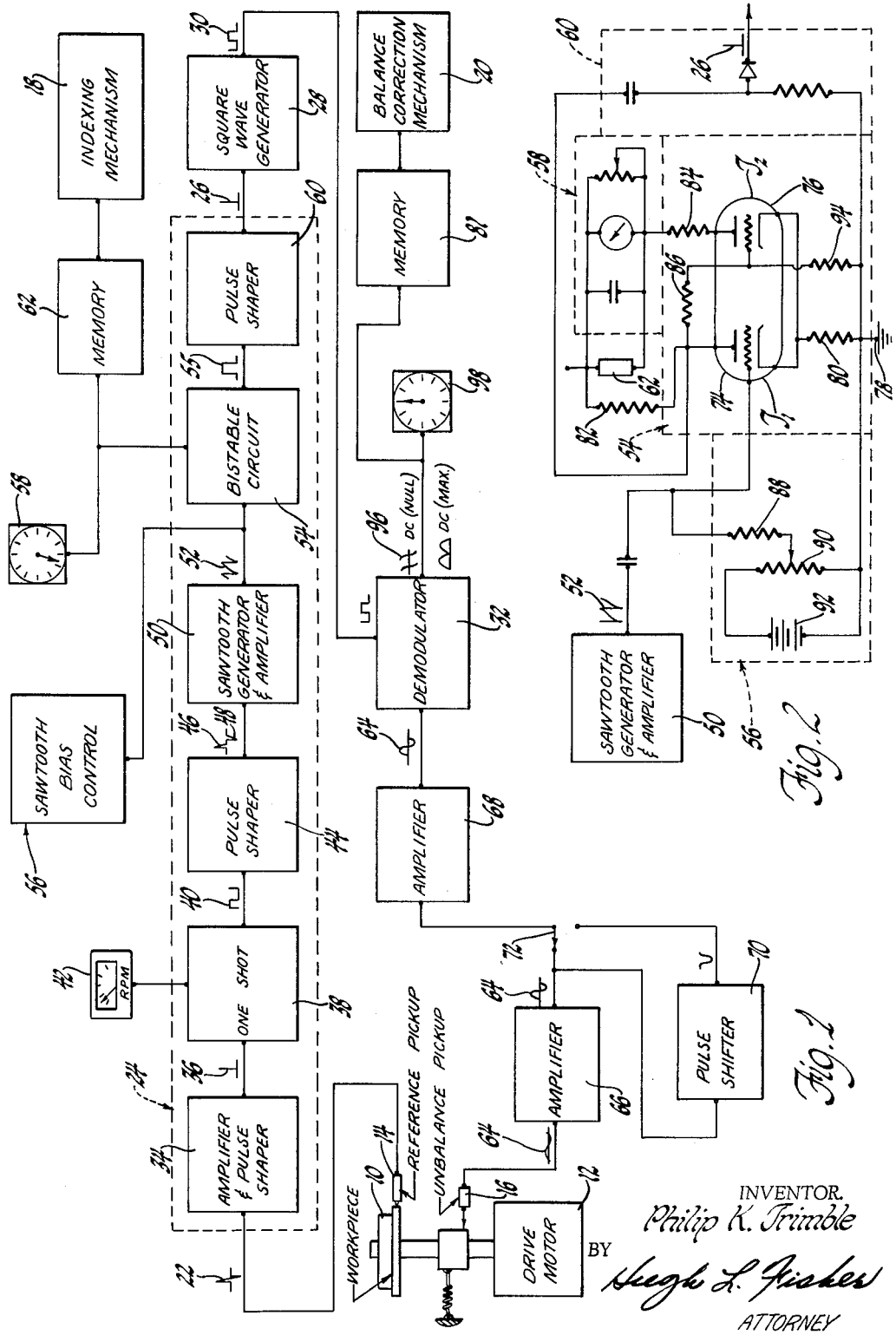

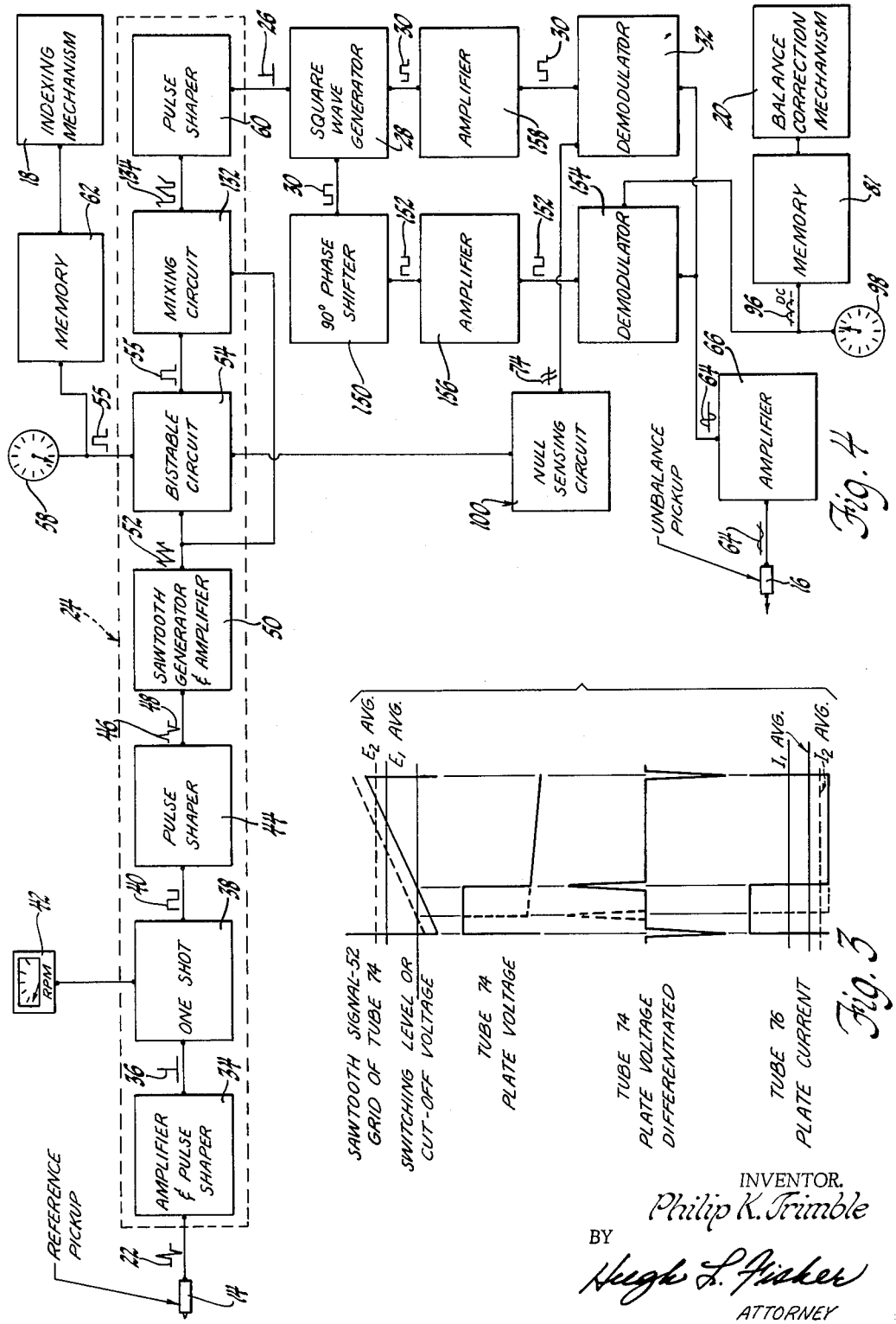

INVENTOR.
Philip K. Trimble
BY
Hugh L. Fisher
ATTORNEY

United States Patent Office 3,228,251
Patented Jan. 11, 1966

3,228,251
UNBALANCE MEASURING SYSTEM
Philip K. Trimble, Rochester, Mich., assignor to General Motors Corporation, Detroit, Mich., a corporation of Delaware
Filed Nov. 5, 1962, Ser. No. 235,380
22 Claims. (Cl. 73—462)

This invention relates to improvements in unbalance measuring systems.

Many different ways of measuring unbalance in a rotating body have been devised. These include the comparison of electrical signals reflecting the actual and the desired characteristics of the unbalance in the body and the angular disposition of the body. The results of a comparison of these two signals is used for measuring the actual unbalance. Such a comparison is frequently not accurate enough for many jobs because a signal having an unbalance characteristic usually includes many spurious signals due to noise and other factors and therefore is difficult to measure. The other proposed ways of comparing the two signals are often very complex and expensive and they still have limited precision.

It is, accordingly, the purpose of the invention to provide a unique unbalance measuring system that overcomes the foregoing problems. The unique system in accordance with the invention phase relates an unbalance signal having the characteristics of the unbalance in the rotating body and a reference signal reflecting the rotational speed of the body as well as the angular disposition thereof, thus affording an accurate, economical system for automatically determining both the amount of unbalance and the location of the unbalance in the rotating body. By the system, the phase relating can be done automatically without concern for external influences.

Specifically, it is proposed to use a detector for comparing the phases of the references signal and the unbalance signal. Any difference in phase will develop an output, which in effect is used to shift the phase of the reference signal until a null output is obtained from the detector. The amount the reference signal is phase shifted indicates the angular location of the unbalance in the rotating body. The amount of unbalance is determined by phase shifting either the unbalance signal or the phase shifted reference signal until a full-wave rectified output is obtained from the detector. The average D.C. level of the full-wave rectified output represents the amount of unbalance in the rotating body.

Novel provision is also made for obtaining 360° phase shifts. This is accomplished by developing from the reference signal a sawtooth voltage, the level of which is varied by a bias control so as to develop a variable phase trigger pulse. The trigger pulse in turn is used to produce an output of square wave form for synchronously rectifying the unbalance signal and producing a corresponding output for operating the bias control. The level of the sawtooth voltage is accordingly varied and the trigger pulse shifted in phase until a null output is obtained. The amount of phase shift of the trigger pulse corresponds to the angular location of the unbalance. A further 90° phase shift of the square wave output for again synchronously rectifying the unbalance signal will develop a full-wave rectified output, the average D.C. level of which represents the amount of unbalance in the rotating body.

Another feature involving 360° phase shift is the unique arrangement for insuring that a trigger pulse is always developed over the entire 360° range. This is achieved by applying the sawtooth voltage to a bistable circuit having an on-off output for developing the trigger pulse. Whenever the sawtooth voltage level is changing in a direction that would otherwise cause the bistable circuit to continue in one operating state and hence no longer develop a trigger pulse, the sawtooth voltage level is altered so as to change the state of the bistable circuit and additionally the sawtooth voltage is mixed with the output from the bistable circuit to insure that there is no lost pulse.

The foregoing and other objects and advantages of the invention will be apparent from the following description and from the accompanying drawings in which:

FIGURE 1 is a block diagram of one unbalance measuring system for carrying out the invention;

FIGURE 2 is a diagram of a bistable circuit used in the FIGURE 1 system;

FIGURE 3 illustrates wave forms developed by the FIGURE 2 circuit;

FIGURE 4 is a block diagram of a fully automatic unbalance measuring system incorporating further principles of the invention;

Figure 5:
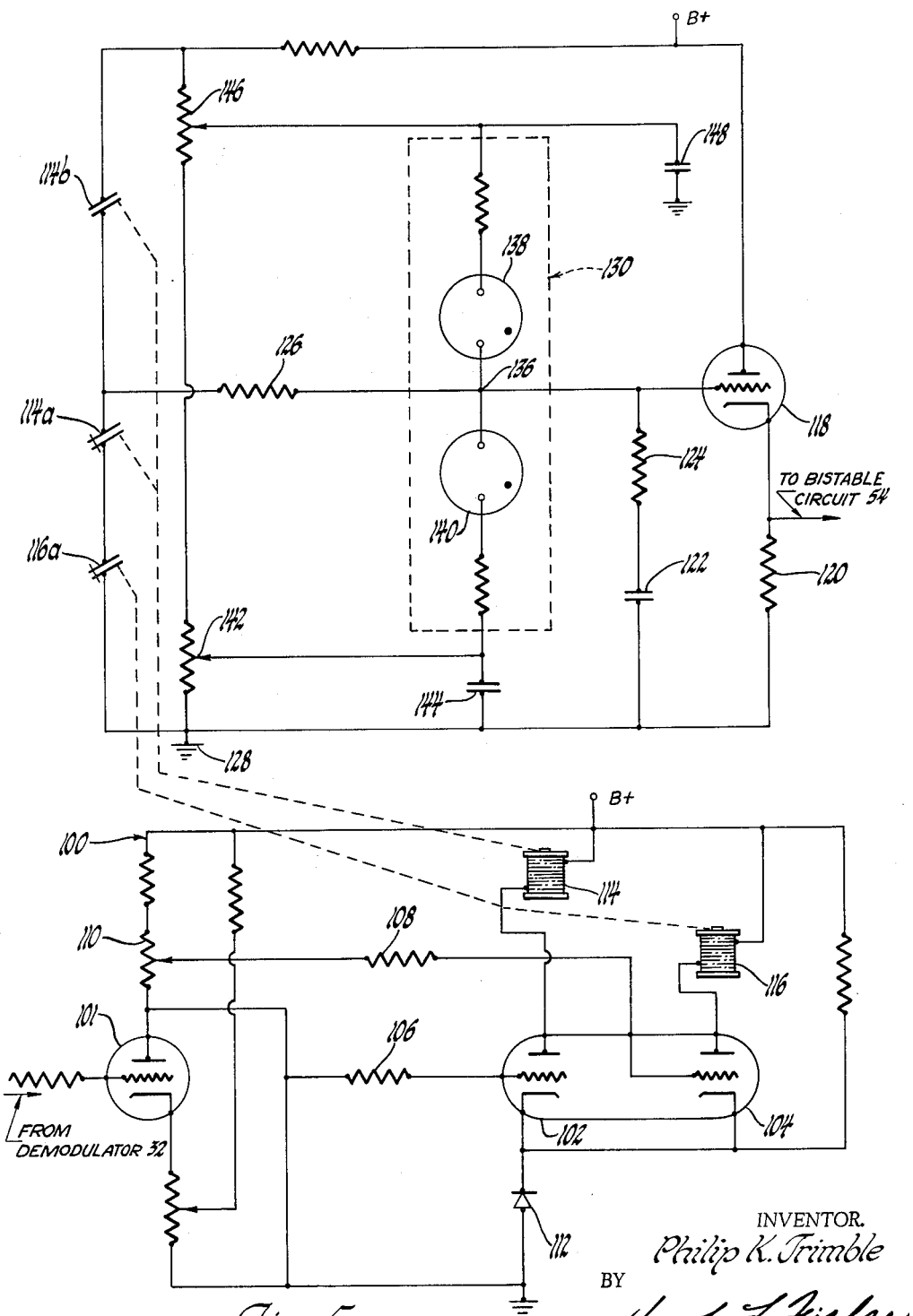
FIGURE 5 is a diagram of a null sensing circuit employed in the FIGURE 4 system.

Referring now to the drawings in detail and initially to FIGURE 1, the apparatus illustrated is for the purpose of measuring the dynamic unbalance in a rotating workpiece 10 and thereafter making the appropriate correction. In this embodiment, the workpiece 10 is revolved by a drive motor 12 at the proper speed for measuring the dynamic unbalance, if any, in the workpiece 10. The information necessary for both measuring the amount of unbalance and the angular location of this unbalance in the workpiece 10 is obtained from a pair of pickups hereinafter referred to as reference and unbalance pickups 14 and 16. This information is used to operate suitable indexing and balance correction mechanisms 18 and 20. The indexing mechanism 18 properly aligns the workpiece 10 for the balance correction mechanism 20. Thereafter, material is either removed from the workpiece 10 or added in a well known way by the balance correction mechanism 20.

The reference pickup 14 may be of any known type such as a magnetic or photoelectric pickup and is so arranged relative to the workpiece 10 as to develop a reference signal 22 having a frequency corresponding to the rotational speed of the workpiece 10. This can be accomplished by having the reference pickup 14 responsive to a reference point on the workpiece; e.g., a hole or a magnetic slug, so that the reference signal 22 will be developed each time this reference point passes the reference pickup 14. The reference signal 22 is then fed to a pulse forming network denoted generally at 24 where a trigger pulse 26 is produced. The trigger pulse 26 is used to trigger a square wave generator 28 from which a square wave control signal 30 of the same phase and frequency as the trigger pulse 26 emanates. The square wave signal 30 is then applied to a detector or demodulator 32, such as disclosed in the U.S. Patent to King 2,988,918. The demodulator 32 is also known as a chopper relay or a synchronous rectifier and functions in the usual manner to rectify a voltage in synchronism with some reference signal, which in this embodiment is the square wave control signal 30. The synchronous rectifying action affords beneficial filtering for unbalance measuring since the average output voltage from all even harmonics is zero and that from all odd harmonics is greatly reduced.

The pulse forming network 24 initially increases the strength of the reference signal 22, then increases and shapes it in an amplifier and pulse shaper 34 so as to provide a narrow positive pulse 36 for tripping a one-shot multivibrator 38. The one-shot multivibrator 38 produces two output signals 40 of a rectangular wave form and constant width. One of the signals 40 operates an r.p.m. meter 42, which affords a visual indication of the speed at which the workpiece 10 is being rotated. The other of signals 40 is differentiated by a pulse shaper 44 to give both a positive pulse 46 and a negative pulse 48. The positive pulse 46 triggers a sawtooth generator and amplifier 50 from which a constant amplitude sawtooth signal 52 is obtained. The sawtooth signal 52 is fed to a switching circuit, such as a bistable circuit 54, which produces an on-off type output signal 55 as will be explained. The alternating output signal 55 will have on and off times dependent upon the point at which the sawtooth slope intersects the cutoff voltage level or switching level of the bistable circuit 54. The level of the sawtooth signal 52 is determined by a sawtooth bias control 56.

The on-off output signal 55 is supplied both to an angle meter 58 and to a pulse shaper 60. The pulse shaper 60 differentiates the on-off output signal 55, and clips the negative pulse so that only the positive trigger pulse 26 remains. The trigger pulse 26 is varied, as will be explained, in phase or time with respect to the clipped negative pulse, which is coincident with the initial reference signal 22. The amount of this phase shift is read directly from the angle meter 58, which responds to the average voltage level of the output signal 55.

The same on-off output signal 55 that is supplied to the angle meter 58 can also be fed to a suitable memory 62 where the average voltage of the output signal 55 can be stored until needed. Subsequently, at the proper time, the information stored by the memory 62 can be utilized by the indexing mechanism 18 to rotate the workpiece 10 from the reference point to the angular location of the unbalance. This aspect of the operation will be further described in the operational summary.

Considering now the unbalance pickup 16, it is arranged so as to develop an unbalance signal 64 of a sinusoidal wave form characteristic of the unbalance in the workpiece 10. The unbalance signal 64 can be very weak and usually includes various spurious signals due to noise and other background effects. Consequently, it is necessary to increase the strength of the unbalance signal 64 and this is done in a first amplifier 66. The increased unbalance signal 64 can be fed directly to a second amplifier 68 or indirectly through a phase shifter 70. This choice is made by a selector switch 72. The further increased unbalance signal 64 is supplied to the demodulator 32 where it is synchronously rectified by the square wave control signal 30.

As has been suggested, the difference in phase between the unbalance signal 64 and the reference signal 22 can be used to determine the angular location of the unbalance relative to the aforementioned reference point. Therefore, by measuring the phase difference and converting it to an angular amount, the actual angle in degrees can be ascertained. This can be done by shifting the phase of one of the signals relative to the other until they correspond and by measuring the amount the one is shifted relative to the other. Because the unbalance signal 64 is sinusoidal in wave form and includes the many spurious signals, greater accuracy can be achieved by shifting the reference signal 22 until it corresponds in phase to the unbalance signal 64. This phase shift is done by a phase shifting network comprising the sawtooth generator and amplifier 50, the bistable circuit 54, and the sawtooth bias control 56.

The phase shifting network can best be explained by referring to FIGURES 2 and 3. Considering first FIGURE 2, the bistable circuit 54 is preferably a Schmitt trigger that includes within a single envelope, two tubes 74 and 76, preferably of the triode kind. The tubes 74 and 76 operate in a well known manner, i.e., only one is conductive at any time as determined by the bias voltage applied to the grid of the tube 74. The cathodes of tubes 74 and 76 are both grounded at 78 through a common resistor 80, whereas the anodes or plates of the tubes 74 and 76 are connected to a B+ voltage source respectively through resistors 82 and 84. The plate of the tube 74 is coupled to the grid of the tube 76 through a resistor 86. The output can be taken from the plate circuit of either the tube 74 or the tube 76 in accordance with the needs of a particular installation.

In this embodiment, the sawtooth signal 52 is applied to the grid of the tube 74 at a level determined by the sawtooth bias control 56. The bias control 56 comprises a bias resistor 88, and a variable resistor 90, which is connected across a voltage source 92. If, as illustrated in FIGURE 3, the sawtooth signal 52 has the $E_1$ average voltage level as compared to the switching level or cutoff voltage for the tube 74, the tube 74 plate voltage will have the wave form indicated. The point of intersection of the increasing sawtooth signal 52 and the switching level will be the point at which the plate voltage decreases and the tube 74 becomes conductive. If the bias control 56 is adjusted so as to increase the sawtooth signal 52 to the $E_2$ average level, the sawtooth signal 52 will intersect the switching level sooner as indicated by the broken line and result in the tube 74 plate voltage wave form indicated also by the broken line. In other words, the tube 74 will become conductive sooner. When the tube 74 plate voltage is differentiated in the pulse shaper 60, the depicted wave forms will be produced. As shown, the positive pulse can be shifted to the dotted line position by adjusting the bias control 56 thereby changing the level of the sawtooth signal 52. The tube 76 plate current will be as seen in FIGURE 3 since tube 76 will only conduct when the tube 74 is nonconductive, this being set by the resistor 86 and a grid bias resistor 94. Hence, the average tube 76 plate current $I_1$ at the $E_1$ average sawtooth voltage level will be as viewed, whereas the $I_2$ average current will be less, since the sawtooth signal 52 is at the $E_2$ average level. This is because the raising and lowering of the voltage level of the sawtooth signal 52 by the bias control 56 changes the on time for the tube 76. The angle meter 58 measures the tube 76 average plate current, which is proportional to the on time of the tube 76 since the tube 76 plate current is constant during the on time and zero during the interval when the tube 76 is nonconductive.

Referring again to the tube 74 plate voltage differentiated wave form in FIGURE 3, the pulse shaper 60 clips the negative spike so that only the trigger pulse 26 remains. With the negative pulse coinciding with the initial reference signal, the positive trigger pulse 26 can be shifted back and forth as determined by the bias level of the sawtooth signal 52 and thus shift the phase of the trigger pulse 26 relative to the phase of the reference signal 22.

The amount the trigger pulse 26 is to be shifted is established by the output from the demodulator 32. Since the trigger pulse 26 operates the square wave generator 28, the square wave control signal 30 will, as explained, have the same phase and frequency as the trigger pulse 26. The edge of the signal 30 coincides with that of the trigger pulse 26 thus providing an accurate control signal for use by the demodulator 32. To measure the angle of the phase shift, the phase of the square wave control signal 30 and that of the unbalance signal 64 must coincide. When this happens, an output signal 96 from the demodulator 32 will have a null average D.C. voltage level and the null indicating wave form shown, i.e., a sine wave reversed at each peak. This is because the demodulator 32, when performing as a synchronous rectifier or as a chopper relay, requires that the sinusoidal unbalance signal 64 be chopped at 90° after the point of zero voltage. To do this, the bias control 56 is adjusted until a suitable amount meter 98, which responds to the average D.C. output from the demodulator 32, reads zero. At this time the reading of the angle meter 58 can be taken and the workpiece 10 revolved this angular amount relative to the reference point either manually or automatically by using the memory 62 and the indexing mechanism 18.

With the unbalance in the workpiece 10 angularly located, it is still necessary to determine the amount of unbalance. When the output signal 96 from the demodulator 32 has the null indicating wave form, either the square wave signal 30 or the unbalance signal 64 can be shifted 90° to obtain a full-wave rectified output, identified as D.C. (max.). By measuring the average D.C. level of this full-wave rectified output as by the amount meter 98, the actual amount of unbalance can be determined and appropriate steps taken such as storing this information in a memory 81. When wanted, the information can be transferred to the balance correction mechanis 20 so as to either drill holes in the workpiece 10 or add strips, e.g., by welding. Of course, how the workpiece 10 is located, its shape, and other factors will determine whether material is added or removed.

Preferably, and as done in the FIGURE 1 embodiment, the amount of unbalance is determined by phase shifting the unbalance signal 64 in the phase shifter 70. This requires moving the selector switch 72 to the broken line position so that the unbalance signal 64 applied to the input of the demodulator 32 is phase shifted 90° and the full-wave rectified output signal 74, identified as D.C. (max.) results.

Briefly summarizing the operation of the FIGURE 1 unbalance measuring system, the unbalance signal 64 obtained by the pickup 16 has the characteristic of unbalance in the workpiece 10 and is applied directly to the one input of the demodulator 32 and not via the phase shifter 70. The reference signal 22 is shaped by the pulse forming network 24 into a trigger pulse 26, which is used to develop the square wave signal 30. The reading of the amount meter 98 is checked and if a null is not observed, the sawtooth bias control 56 is adjusted as required to shift the phase of the trigger pulse 26 in the appropriate direction to either move the level of the sawtooth signal 52 up or down. As soon as the amount meter 98 shows a zero reading, the angle meter 58 can be checked for the actual angle at which the unbalance is located relative to the reference point on the workpiece 10. This information, as suggested before, can be stored in the memory 62 until needed for use by the indexing mechanism 18.

The next step is to move the selector switch 72 to the broken line position so that the unbalance signal 64 is shifted the required 90°. Consequently, the demodulator 32 full-wave rectifies the unbalance signal 64 and the average D.C. level of this full-wave rectified output signal 96 corresponds to the amount of unbalance indicated and noted on the amount meter 98 and is stored in the memory 81 until required by the balance correction mechanism 20.

The system portrayed in FIGURE 4 performs automatically, thus eliminating the need for the selector switch 72 and the sawtooth bias control 56, both used in the FIGURE 2 system. In describing the FIGURE 4 system, the same FIGURE 2 numbers are used where appropriate.

To effect automatic bias control of the sawtooth voltage signal 52, a null sensing circuit designated generally by the numeral 100 is employed. The null sensing circuit 100 has the output signal 96 from the demodulator 32 applied to the input thereof and will develop a D.C. bias voltage corresponding to that needed for the demodulator 32 to develop a null output signal 96. The details of the null sensing circuit 100 are depicted in FIGURE 5. As shown there, the output signal 96 is supplied to the grid of a three-element control tube 101. The conductivity of the control tube 101 is then used to operate two relay control tubes 102 and 104, which are preferably housed within a single envelope and each is of the three-element type. Of course, other kinds of tubes may be used in place of the tubes 101, 102, and 104. The two relay control tubes 102 and 104 operate at different voltage levels. This is done by connecting the plate circuit of the control triode 101 to the grid of the relay control tube 102 through a fixed resistor 106 and to the grid of the relay control tube 104 through both a fixed resistor 108 and a variable resistor 110. The cathodes of the relay control tubes 102 and 104 are held at a relatively fixed voltage by a zener diode 112 so that there is no negative feedback. The zener diode 112 also permits the cathode voltage to be maintained at a sufficiently high positive voltage that a positive grid voltage can be used, i.e., the grid voltage can be positive but still negative relative to the cathode voltages. Completing the arrangement are the relays 114 and 116, which are respectively in the plate circuits of the relay control tubes 102 and 104.

The function of the relays 114 and 116 is to control the voltage on the grid of a cathode follower 118. The output taken across a cathode resistor 120 serves as the bias voltage for the tube 74 in the bistable circuit 54. This is done by changing the status of contacts 116a and contacts 114a and 114b so as to vary the amount of the charge applied by the B+ voltage source to a grid control condenser 122.

To understand the operation of the null sensing circuit 100, it will first be assumed that the rectified unbalance or output signal 96 from the demodulator 32 has an average D.C. value that is positive. This positive output signal 96 will increase the conductivity of the control tube 101 and hence, its plate voltage will decrease. This decreased plate voltage causes both the relay control tubes 102 and 104 to shut off and therefore deenergize their respective relays 114 and 116. With the relays 114 and 116 deenergized, the associated contacts 114a and 114b and the contacts 116a will all assume their normal positions illustrated, i.e., the contacts 114a will be closed; the contacts 114b opened; and the contacts 116a closed. As a result, the grid control condenser 122 discharges through the resistors 124 and 126 to ground at 128 through the closed contacts 114a and 116a. The plate voltage on the cathode follower 118 will increase, whereas the voltage across the cathode resistor 120 will decrease; hence, the bias voltage fed to the bistable circuit 54 will decrease. As has been mentioned before, a decreased bias voltage will move the sawtooth signal 52 to the right as viewed in FIGURE 3 so as to produce the desired null output signal 96 from the demodulator 32.

On the other hand, if the output signal 96 has an average D.C. value that is negative, then the plate voltage of the control tube 100 will increase so that both the relay control tubes 102 and 104 are turned on to the extent necessary to energize both of the relays 114 and 116. All of the contacts 114a, 114b and 116a change their status, and therefore, only the contacts 114b are closed. This connects the grid control condenser 122 to the B+ voltage source instead of to ground at 128. The grid of the cathode follower 118 will now have a positive potential and the bias voltage, which is that appearing across the cathode resistor 120, will increase as has been discussed in the description of the FIGURE 2 system. An increased bias voltage shifts the sawtooth signal 52 as illustrated in FIGURE 3 to the left which is necessary under these conditions to obtain a null output signal 96 from the demodulator 32.

The other condition of operation of the null sensing circuit 100 occurs when a null output signal 96 is applied to the grid of the control tube 101. The control tube 101 conducts so that its plate voltage assumes some intermediate level that is adequate due to the biasing of the relay control tubes 102 and 104 to render only the relay control tube 104 conductive. Consequently, only the one relay 116 is energized and its normally closed contacts 116a are opened. An inspection of FIGURE 5 will show that whatever potential is on the grid control condenser 122 at this time is maintained since the connections to ground at 128 and to the B+ voltage source are interrupted. Therefore, the bias voltage appearing across the cathode resistor 120 is that producing a null and is accordingly retained.

To achieve a full 360° phase shift, the FIGURE 4 system includes two additional and very significant features. These are an end switching network designated generally by the numeral 130 in FIGURE 5 and a mixing circuit 132 shown in FIGURE 4 between the bistable circuit 54 and the pulse shaper 60. The need for the end switching network 130 and the mixing network 132 will become more apparent.

Figure 6:
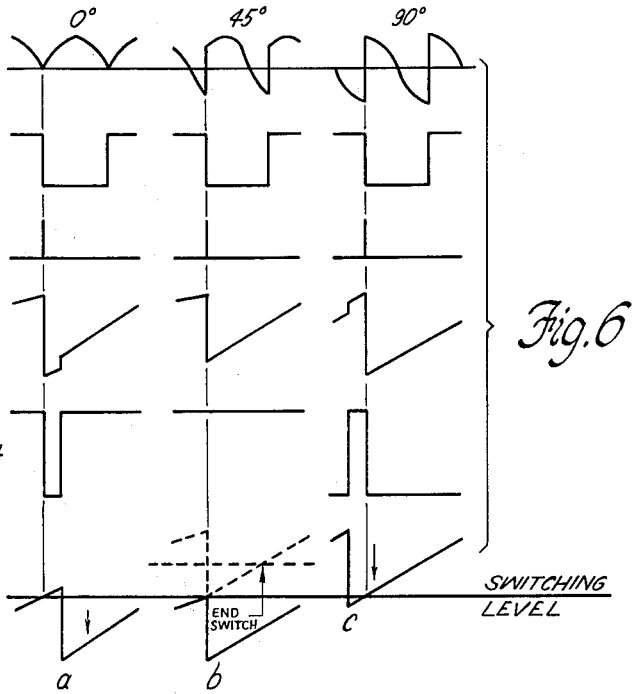
FIGURES 6 and 7 show wave forms developed in the FIGURE 4 system during different conditions of operation.

Considering a specific example of where end switching is necessary, reference is now made to the column (a) wave forms in FIGURE 6. As illustrated, the sawtooth signal 52 on the grid of the tube 74 intersects a switching level line at the designated point when being moved downward in the direction of the arrow. The tube 74 will produce the plate voltage wave form shown. Thereafter, the tube 74 plate voltage is mixed with the sawtooth voltage signal 52 by a suitable mixing circuit 132 in a known way to obtain a composite mixed signal 134, of the depicted wave form. The pulse shaper 60 will produce the illustrated trigger pulse 26, which in turn produces the square wave control signal 30 through the intermediary of the square wave generator 28. The reference edge, which is the left edge, of the square wave signal 30 will rectify the unbalance signal at the point of zero voltage and result in a rectified unbalance or output signal 96 having a maximum positive D.C. level. Consequently, to obtain a null, the trigger pulse 26 must be moved to the right as viewed in column (a) of FIGURE 6. The adjustment will be made automatically by the null sensing circuit 100 and the wave forms shown in column (b) of FIGURE 6 will result. But at this point, the sawtooth signal 52 is moved so that the top edge coincides with the switching level line. The tube 74 will now remain nonconductive as the level of the sawtooth signal 52 is decreased or is shifted further downwardly and the tube 74 plate voltage will become constant as indicated. Without the on-off aspect no trigger pulse 26 is developed; hence, the sawtooth signal 52 is mixed with the constant tube 74 plate voltage. This is the reason for using the mixed signal 134, for there is assurance that an on-off signal for developing the trigger pulse 26 is always available, even when the tube 74 plate voltage is constant. Actually, when the tube 74 plate voltage is constant, the mixed signal 134 has an undistorted sawtooth wave form as shown in column (b) of FIGURE 6. The trigger pulse 26 is shifted in the foregoing way and will, accordingly, shift the reference edge of the square wave signal 30 so as to chop the unbalance signal 64 forty-five degrees after the point of zero voltage. The average D.C. level of the output signal 96 chopped at 45° is still positive and requires that the square wave control signal 30 be shifted further to the right. Since the sawtooth signal 52 causes the tube 74 to remain nonconductive, any further movement of the sawtooth signal 52 in the direction of the arrow or in the decreasing voltage level direction will not produce the desired result. This condition occurs when at the phase angle of 360°.

The just discussed problem is overcome by the end switching network 130. With the mentioned condition, the null sensing circuit 100 will continue to decrease the bias voltage supplied to the grid of the tube 74. Accordingly, the charge on the grid control capacitor 122 will result in some minimum potential at a junction 136 between a pair of low and high end switching neon lamps 138 and 140 constituting the end switching network 130. The potential across the neon lamp 138 is determined by the setting of a potentiometer 146, which in turn determines the charge on a low end switching capacitor 148. Hence, when this potential at the junction 136 decreases to a predetermined level, the low end switching neon lamp 138 will fire and the grid control condenser 122 will be quickly charged by the low end switching condenser 148 until the low end switching neon lamp 138 is again cut off due to the voltage across the lamp 138 returning to the cutoff level. Consequently, the bias voltage across the cathode resistor 120 will have increased causing the sawtooth signal 52 to end switch or move up to the broken line position in column (b) of FIGURE 6 so that the bottom of the sawtooth signal 52 now coincides with the switching level. The bias voltage applied to the grid of the tube 74 can again continue to decrease in the direction of the arrow in column (c) of FIGURE 6. The tube 74 plate voltage will therefore have the indicated wave form depicted in column (c). The mixed signal 134 will be as shown and the trigger pulse 26 will be further shifted to the right, and accordingly, the square wave signal 30 so as to produce the null output signal 96 because the unbalance signal 64 is chopped at 90° after the point of zero voltage.

Figure 7:
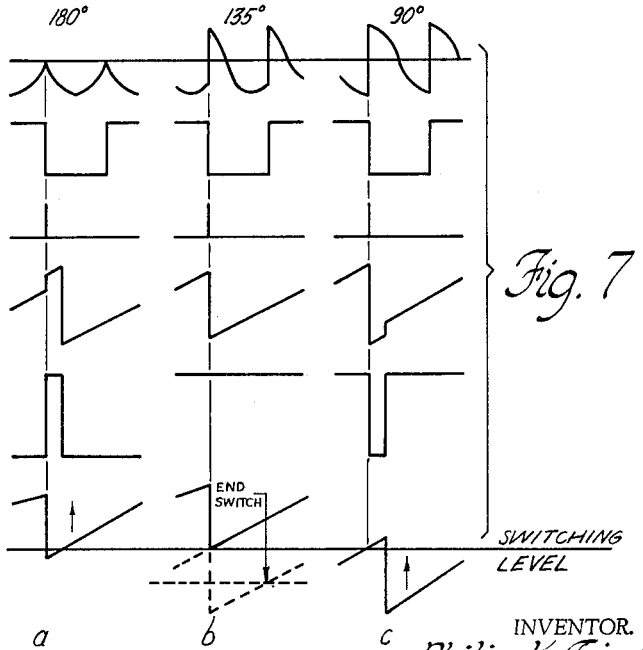

The opposite condition is portrayed in FIGURE 7. As shown in column (a), the sawtooth signal 52 applied to the grid of the tube 74 has the bottom just below the switching level of the tube 74 and is being moved upwardly into the range where the tube 74 will remain continuously conductive. The tube 74 plate voltage has the indicated wave form as does the mixed signal 134. The resultant trigger pulse 26 will cause the square wave generator 28 to develop the square wave signal 30 with the reference edge aligned such that the unbalance signal 64 is rectified or chopped at 180° after the point of zero voltage, thus producing a rectified unbalance or output signal 74 having a maximum negative average D.C. level. To obtain a null, the reference edge of the square wave signal 30 must be moved to the left but, again as shown in column (b), shifting the square wave signal 30 to the left causes the unbalance signal 64 to be chopped at 135° after the point of zero voltage and the sawtooth signal 52 now has the bottom coinciding with the switching level of the tube 74. Hence, the tube 74 plate voltage is constant and the mixed signal 134 is entirely of a sawtooth wave form, which is relied upon to develop the trigger pulse 26. As now can be appreciated, a further increase in the level of the sawtooth signal 52, i.e., above the switching level, accomplishes nothing.

This latter condition indicates that the bias voltage across the cathode resistor 120 has attained a maximum and, therefore, the potential at the junction 136 of the end switching network 130 will be a maximum. The high end switching neon lamp 140 is biased by the potentiometer 142 so that the condenser 144 is charged to the proper voltage for causing the neon lamp 140 to conduct when the potential at the junction 136 reaches the mentioned maximum. When the high end switching neon lamp 140 fires, a low impedance path is provided for discharging the grid control condenser 122 by charging the condenser 144 which, of course, is at a lower potential than the junction 136. As the potential of the grid control condenser 122 decreases, the potential at the junction 136 will also decrease, and therefore, the high end switching neon lamp 140 will cut off. The bias voltage across the cathode resistor 120 will have been decreased until the sawtooth signal 52 is moved or end switched below the switching level to the broken line position viewed in column (b) of FIGURE 7. At this point, the top of the sawtooth signal 52 is just below the switching level or at a 360° phase angle, thus permitting the bias voltage across the cathode resistor 120 to again start increasing so as to move the sawtooth signal 52 upwardly in the direction of the arrow shown in column (c) of FIGURE 7. This shifts the trigger pulse 26 further to the left so that the rectifying is done at 90° after the point of zero voltage and the desired null output signal 96 is obtained.

The FIGURE 4 automatic system in eliminating the FIGURE 2 selector switch 72 provides a 90° phase shifter 150, which shifts the square wave control signal 30 to provide a 90° phase shifted square wave control signal 152. The control signal 152 is then used by a demodulator 154 in the same way as the demodulator 32 to synchronously rectify the unbalance signal 64. If the control signal 30 has been phase shifted to produce a null output signal 96, the further shift of 90° of the control signal 30 will cause the unbalance signal 64 to be chopped at the point where a maximum D.C. output signal 96 is obtained as has been previously explained. The output signal 96 can again be used in the amount meter 98 for visually indicating the amount of unbalance, or stored in the memory 81 for later use by the balance correction mechanism 20.

If wanted, amplifiers 156 and 158 can be included in the FIGURE 4 system for respectively increasing the control signals 152 and 30 or for whatever other purpose desired.

Summarizing the operation of the automatic system in FIGURE 4 as previously explained, the reference pickup 14 in the pulse forming network 24 develops a trigger pulse 26, which initially corresponds in phase to that of the reference signal 22.

The trigger pulse 26 triggers the square wave generator 28 and a square wave control signal 30 results. The unbalance signal 64 derived from the unbalance pickup 16 is increased in amplitude by the amplifier 66 and also applied to the demodulator 32. The demodulator 32 then rectifies the unbalance signal 64 in synchronism with the square wave control signal 30. If the resultant output signal 96 from the demodulator 32 is anything but a null, the null sensing circuit 100 will develop the proper bias voltage, which will change the level of the sawtooth signal 52 applied to the bistable circuit 54. Accordingly, the on-off time of the bistable circuit 54 will be changed. The on-off output signal 55 from the bistable circuit 54 is mixed in the mixing circuit 132 with the sawtooth signal 52 to produce the mixed signal 134 and thereafter is shaped by the pulse shaper 60 to provide the trigger pulse 26. The trigger pulse 26 will be shifted in phase an amount corresponding to the bias voltage developed by the null sensing circuit 100. The amount that the trigger pulse 26 has been shifted relative to the reference signal 22 can be observed from an inspection of the angle meter 58 as well as stored in the memory 62 for use by an indexing mechanism 18.

The measurement of the amount of the unbalance error merely requires, when a null is obtained, that the square wave control signal 30 be shifted 90°, which is done in the 90° phase shifter 150. Subsequently, the unbalance signal 64 is synchronously rectified in the demodulator 154 by this 90° phase shifted square wave control signal 152. The resultant output signal 96 will be full-wave rectified and can be stored in the memory 81 until required by the balance correction mechanism 30, which either removes or adds material at the angular location the workpiece 10 is positioned by the indexing mechanism 18.

From the foregoing, it will be appreciated that a very sensitive and accurate unbalance measuring system has been devised. The mere fact that the unbalance signal 64 includes considerable noise is of no concern because the reference signal 22 is the one that is, in effect, phase shifted. Moreover, the reference edges of the signals derived from the reference signal 22 can be, and are, made very precise for accurate measurement purposes. The system can be completely automatic with the null sensing providing a full 360° range of phase shifts due to the unique end switching and mixing arrangement. Additionally, the demodulators employed afford filtering, further eliminating many of the objectionable external influences.

The invention is to be limited only by the following claims.

I claim:

1. In an unbalance measuring system, the combination of means generating an unbalance signal having the characteristics of unbalance in a rotating body, means generating a reference signal having a frequency corresponding to the rotational velocity of the body, means detecting the phase relationship between the reference and the unbalance signals and developing a corresponding output, means shifting the phase of one of the signals, the phase shifting means including means shaping the one signal so that the phase of the one signal can be varied by altering the level thereof, electrical means responsive to the output from the detecting means for supplying a proportional bias voltage to the phase shifting means for varying the level of the shaped signal correspondingly so as to cause the one signal to be phase shifted until a predetermined relationship is established between the reference and the unbalance signals, and means utilizing the amount the one signal is phase shifted for determining one of the characteristics of unbalance in the body.

2. In an unbalance measuring system, the combination of means generating an unbalance signal having the characteristics of unbalance in a rotating body, means generating a reference signal having a frequency corresponding to the rotational speed of the body, means detecting the phase relationship between the reference and the unbalance signals and developing a corresponding output, means shifting the phase of one of the signals, the phase shifting means including means developing a sawtooth signal from the one signal, electronic bias control means responsive to the output from the detecting means for supplying a proportional bias voltage to the phase shifting means for altering the sawtooth signal level correspondingly so as to cause the one signal to be phase shifted until a predetermined relationship is established between the reference and the unbalance signal, and means utilizing the amount the one signal is phase shifted for determining the angular location of the unbalance in the body.

3. In an unbalance measuring system, the combination of means generating an unbalance signal having the characteristics of unbalance in a rotating body, means generating a reference signal corresponding to the angular disposition of the body, means detecting the phase relationship between the reference and unbalance signals and developing a corresponding output, means shifting the phase of the reference signal, the phase shifting means including means shaping the reference signal so that the phase of the reference signal can be varied by altering the level thereof, electrical means responsive to the output from the detecting means for supplying a proportional D.C. bias voltage to the phase shifting means for varying the level of the shaped signal correspondingly so as to cause the reference signal to be phase shifted until a predetermined phase relationship is established between the reference and the unbalance signals, and means utilizing the amount the reference signal is phase shifted for determining the angular location of the unbalance in the body.

4. In an unbalance measuring system, the combination of means generating an unbalance signal having the characteristics of unbalance in a rotating body, means generating a reference signal having a frequency corresponding to the rotational speed of the body, a pulse forming network arranged so as to have the reference signal applied thereto and produce therefrom a trigger pulse having a phase relationship to the reference signal that varies in accordance with a D.C. bias signal, means responsive to the trigger pulse for developing a control signal having a phase and a frequency determined by the trigger pulse, means synchronously rectifying the unbalance signal in accordance with the control signal and developing a corresponding output, electronic means responsive to the output from the synchronously rectifying means for providing a proportional D.C. bias signal to the pulse forming network so as to alter the phase of the trigger pulse until a null average D.C. output from the synchronously rectifying means is obtained, and means utilizing the amount the trigger pulse is shifted in phase for determining the angular location of the unbalance in the rotating body.

5. In an unbalance measuring system, the combination of means generating an unbalance signal having the characteristics of unbalance in a rotating body, means generating a reference signal having a frequency corresponding to the rotational speed of the body and also corresponding to the angular disposition of the body, a sawtooth generator triggered by the reference signal so as to provide a sawtooth voltage of a frequency and phase determined by the frequency and phase of the reference signal, a switching circuit having the input thereof operatively connected to the output of the sawtooth generator so as to provide a trigger pulse having a phase determined by the bias level of the switching circuit, a D.C. bias control for changing the bias level of the switching circuit, a square wave generator operatively connected to the switching circuit so as to provide a square wave control signal having a phase and frequency determined by the trigger pulse and that is uninfluenced by variations in the speed of the rotating body, a synchronous rectifier arranged so as to synchronously rectify the unbalance signal in accordance with the square wave control signal and develop an output determined by the phase relationship between the square wave control and the unbalance signals, electronic means responsive to the output from the synchronous rectifier for controlling the bias control so as to vary the bias level of the switching circuit and accordingly the phase of the trigger pulse until a null average D.C. output from the synchronous rectifier is obtained, and means utilizing the amount the trigger pulse is shifted in phase to produce the null for determining the angular location of the unbalance in the rotating body.

6. In an unbalance measuring system, the combination of means generating an unbalance signal having the characteristics of unbalance in a rotating body, means generating a reference signal having a frequency corresponding to the rotational speed of the body, a sawtooth generator arranged so as to be triggered by the reference signal and develop an output sawtooth voltage having a relatively constant amplitude and a frequency and phase determined by the phase and frequency of the reference signal, a bistable circuit responsive to the sawtooth voltage and having a two condition output determined by the bias level thereof, a trigger pulse forming circuit connected to the output of the bistable circuit and providing a trigger pulse coincident with the change of one of the conditions of the bistable circuit, a square wave generator responsive to the trigger pulse for providing a square wave control signal having a phase and frequency determined by the trigger pulse and that is uninfluenced by variations in the speed of the rotating body, a synchronous rectifier arranged so as to synchronously rectify the unbalance signal in accordance with the square wave control signal, an electronic null sensing circuit responsive to the output from the synchronous rectifier for providing a proportional D.C. bias voltage to the bistable circuit so as to change the bias level and accordingly the phase of the trigger pulse until a null average D.C. output from the synchronous rectifier is obtained, and means utilizing the amount the phase of the trigger pulse is shifted for determining the angular location of the unbalance in the rotating body.

7. In an unbalance measuring system, the combination of means generating an unbalance signal having the characteristics of unbalance in a rotating body, means generating a reference signal having a frequency corresponding to the rotational speed of the body, means detecting the phase relationship between the reference and the unbalance signals and developing a corresponding output, means shifting the phase of the reference signal in accordance with a bias voltage, electrical means responsive to the output from the detecting means for supplying a proportional bias voltage to the phase shifting means so as to cause the reference signal to be phase shifted relative to the unbalance signal until a null average D.C. output is obtained from the detecting means, means phase shifting one of the signals after the null output is obtained to provide a maximum D.C. average output from the detecting means, and means utilizing the maximum D.C. average output for determining the unbalance in the body.

8. In an unbalance measuring system, means generating an unbalance signal having the characteristics of unbalance in a rotating body, means generating a reference signal having a frequency corresponding to the rotational speed of the body, a pulse forming network arranged so as to have the reference signal applied thereto and produce therefrom a trigger pulse having a phase relationship to the reference signal that varies in accordance with a D.C. bias voltage, means responsive to the trigger pulse for developing a control signal having a phase and frequency determined by the trigger pulse, means synchronously rectifying the unbalance signal in accordance with the control signal and developing a corresponding output, electronic means responsive to the output from the synchronously rectifying means for providing a proportional D.C. bias signal to the pulse forming network so as to alter the phase of the trigger pulse until the average D.C. value of the output from the synchronously rectifying means is null, means phase shifting one of the signals after the null output is obtained so as to provide a maximum D.C. average value from the rectifying means, and means utilizing the maximum average D.C. value for determining the unbalance in the rotating body.

9. In an unbalance measuring system, the combination of means generating an unbalance signal having the characteristics of unbalance in a rotating body, means generating a reference signal having a frequency corresponding to the rotational speed of the body, a sawtooth generator arranged so as to be triggered by the reference signal and develop an output sawtooth voltage having a constant amplitude and a frequency and phase determined by the phase and frequency of the reference signal, a bistable circuit responsive to the sawtooth voltage and having a two condition output determined by the bias level thereof, a trigger pulse forming circuit connected to the output of the bistable circuit and providing a trigger pulse coincident with the change of one of the conditions of the bistable circuit, a square wave generator responsive to the trigger pulse for providing a square wave output having a phase and frequency determined by the trigger pulse, a first synchronous rectifier arranged so as to synchronously rectify the unbalance signal in accordance with the square wave output signal, a null sensing circuit responsive to the output from the synchronous rectifier for providing a proportional D.C. bias voltage to the bistable circuit so as to change the bias level and accordingly the phase of the trigger pulse until a null average D.C. output from the first synchronous rectifier output is obtained, means phase shifting the square wave output, a second synchronous rectifier arranged so as to synchronously rectify the unbalance signal in accordance with the phase shifted square wave output so as to provide a maximum D.C. average output, and means utilizing the maximum D.C. average output for determining the amount of unbalance in the rotating body.

10. In an unbalance measuring system, the combination of means generating an unbalance signal having the characteristics of unbalance in a rotating body, means generating a reference signal having a frequency corresponding to the rotational speed of the body, means detecting the phase relationship between the reference and the unbalance signal and developing a corresponding output, means shifting the phase of the reference signals relative to each other in accordance with a bias voltage, electrical means responsive to the output from the detecting means for supplying a proportional bias voltage to the phase shifting means until a certain average D.C. output is obtained from the detecting means, means phase shifting one of the signals after the certain output is obtained to provide a maximum D.C. average output from a detecting means, and means utilizing the maximum D.C. average output for determining the unbalance in the body and the amount the phase shift for determining the angular location of the unbalance in the body.

11. In an unbalance measuring system, the combination of means generating an unbalance signal having the characteristics of unbalance in a rotating body, means generating a reference signal having a frequency corresponding to the rotational speed of the body, a pulse forming network arranged so as to have the reference signal applied thereto and produce therefrom a trigger pulse having a phase relationship to the reference signal that varies in accordance with a D.C. bias signal, means responsive to the trigger pulse for developing a control signal having a phase and a frequency determined by the trigger pulse, means synchronously rectifying the unbalance signal in accordance with the control signal and developing a corresponding output, electronic means responsive to the output from the synchronously rectifying means for providing a proportional D.C. bias signal to the pulse forming network so as to alter the phase of the trigger pulse until the average D.C. value of the output is null, means shifting the phase of the control signal after the null output is obtained until the average D.C. value of the output from the synchronously rectifying means is maximum, and means utilizing the amount the reference signal is phase shifted for determining the angular location of the unbalance in the body and the maximum average D.C. value of the output for determining the unbalance in the rotating body.

12. In an unbalancing measuring system, the combination of means generating an unbalance signal having the characteristics of unbalance in a rotating body, means generating a reference signal having a frequency corresponding to the rotational speed of the body and also corresponding to the angular disposition of the body, a sawtooth generator triggered by the reference signal so as to provide a relatively constant amplitude sawtooth voltage of a frequency and phase determined by the frequency and phase of the reference signal, a switching circuit having the input thereof operatively connected to the output of the sawtooth generator so as to provide a trigger pulse having a phase determined by the bias level of the switching circuit, a square wave generator operatively connected to the switching circuit so as to provide a square wave control signal having a phase and frequency determined by the trigger pulse and that is uninfluenced by variations in the speed of the rotating body, a first synchronous rectifier arranged so as to synchronously rectify the unbalance signal in accordance with the square wave control signal and develop an output determined by the phase relationship between the square wave and the unbalance signals, electronic means responsive to the output from the first synchronous rectifier for controlling the bias level of the sawtooth voltage and accordingly cause the phase of the trigger pulse to be varied until a null average D.C. value of the output from the first synchronous rectifier is obtained, means phase shifting the square wave control signal, a second synchronous rectifier arranged so as to synchronously rectify the unbalance signal in accordance with the phase shifted square wave control signal so as to provide a maximum D.C. average output, and means utilizing the amount the trigger pulse is shifted in phase to produce the null for determining the angular location of the unbalance in the rotating body and the maximum D.C. average output for determining the unbalance in the rotating body.

13. In a phase shifting network, the combination of means generating a reference pulse, a sawtooth generator responsive to the reference pulse for providing a sawtooth voltage of a frequency and a phase determined by the frequency and the phase of the reference pulse, a bistable circuit responsive to the sawtooth voltage and having a two state output determined by the sawtooth voltage level, a variable D.C. bias voltage for changing the sawtooth voltage level, and means switching the voltage level between predetermined limits so as to change the state of the output of the bistable circuit whenever the direction of change of the sawtooth voltage level causes the bistable circuit to continue in one state so as to provide a 360° range of phase shifting.

14. In a phase shifting network, the combination of means generating a reference signal, a pulse generator responsive to the reference signal for providing a phase shifting voltage of a predetermined wave form and of a frequency and a phase determined by the frequency and the phase of the reference signal, a switching circuit having the input thereof operatively connected to the output of the pulse generator so as to provide a periodic output pulse having a phase determined by the bias level of the phase shifting voltage, a variable bias control for changing the bias level of the phase shifting voltage thereby changing the phase of the periodic output pulse relative to the phase of the reference signal, and means switching the level of the phase shifting voltage between predetermined limits so as to change the state of the switching circuit output whenever the direction of change of the phase shifting voltage level causes the switching circuit to continue in one state and thereby provide a 360° range of phase shifting.

15. In a 360° phase shifting network, the combination of means generating a reference pulse, a sawtooth generator responsive to the reference pulse for providing a relatively constant amplitude sawtooth voltage of a frequency and a phase determined by the frequency and the phase of the reference pulse, a bistable circuit responsive to the sawtooth voltage and having an on-off output determined by the sawtooth voltage level, a variable D.C. bias voltage for changing the sawtooth voltage level, means switching the voltage level between predetermined limits so as to change the state of the bistable circuit output whenever the direction of change of the sawtooth voltage level causes the bistable circuit to continue in one state, means mixing the outputs from the sawtooth generator and the bistable circuit so as to provide a composite output that is always alternating, and a differentiating circuit having the composite output applied thereto for providing an output pulse of a phase relative to the phase of the reference pulse determined by the magnitude of the D.C. bias voltage.

16. In combination, bias voltage level responsive means adjusting the output voltage from a circuit, electrical means sensing the output voltage and varying the adjusting means in accordance therewith, the electrical sensing means including a source of variable voltage and switching means responsive to the output voltage from the circuit and operative in accordance therewith to apply different voltages from the source to the adjusting means so as to cause the circuit to have a predetermined output voltage.

17. In combination, bias voltage level responsive means adjusting the output voltage from a circuit, and electronic means sensing the output voltage and varying the adjusting means in accordance therewith, the electronic sensing means including a source of variable bias voltages, a control device having an input circuit and an output circuit operatively connected to the adjusting means, and switching means responsive to the output voltage from the circuit and operative in accordance therewith to cause different voltages from the source to be applied to the input circuit of the control device so as to cause corresponding bias voltages to be applied by the output circuit to the adjusting means and thereby cause the circuit to have a predetermined output voltage.

18. In combination, bias voltage level responsive means adjusting the output voltage from a circuit, electronic means sensing the output voltage and varying the adjusting means in accordance therewith, the electronic sensing means including a source of variable voltages, a control device having an input circuit and an output circuit connected to the adjusting means, switching means responsive to the output voltage from the circuit and operative to cause different voltages from the source to be applied to the input circuit of the control device so as to cause corresponding voltages to be applied by the output circuit to the adjusting means and thereby cause the circuit to have a predetermined output voltage, and voltage regulating means operative to maintain the voltage applied by the source to the input circuit of the control device within predetermined maximum and minimum limits.

19. In an unbalance measuring system, the combination of means generating an unbalance signal having the characteristics of unbalance in a rotating body, means generating a reference signal corresponding to the angular disposition of the body, means detecting the phase relationship between the signals and developing a corresponding output, means shifting the phase of one of the signals, the phase shifting means including means shaping the one signal so that the phase of the one signal can be varied by altering the level thereof, electrical means sensing the output from the detecting means, the sensing means including means operative in response to the output from the detecting means to supply a proportional bias voltage to the phase shifting means for altering the level of the shaped signal correspondingly so as to cause the one signal to be phase shifted until a predetermined phase relationship is established between the reference and the unbalance signals, and means utilizing the amount the one signal is phase shifted for determining the angular location of the unbalance in the body.

20. In an unbalance measuring system, the combination of means generating an unbalance signal having the characteristics of unbalance in a rotating body, means generating a reference signal having a frequency corresponding to the rotational speed of the body, means detecting the phase relationship between the signals and developing a corresponding output, means shifting the phase of one of the signals in accordance with a bias voltage, electrical means sensing the output from the detecting means, the electrical sensing means including means operative in response to the output from the detecting means to supply in accordance therewith a proportional bias voltage to the phase shifting means so as to cause the one signal to be phase shifted until a null average D.C. output is obtained from the detecting means, means phase shifting one of the signals after the null output is obtained to provide a maximum D.C. average output from the detecting means, and means utilizing the maximum D.C. average output for determining the unbalance in the body.

21. In an unbalance measuring system, the combination of means generating an unbalance signal having the characteristics of unbalance in a rotating body, means generating a reference signal having a frequency corresponding to the rotational speed of the body, a pulse forming network arranged so as to have the reference signal applied thereto and produce therefrom a trigger pulse having a phase relationship to the reference signal that varies in accordance with a D.C. bias signal, means responsive to the trigger pulse for developing a control signal having a phase and a frequency determined by the trigger pulse, means synchronously rectifying the unbalance signal in accordance with the control signal and developing a corresponding output, electronic means sensing the output from the synchronously rectifying means, the electronic sensing means including a control device having an output circuit operatively connected to the pulse forming network and an input circuit, and means responsive to the output from the synchronously rectifying means for applying a proportional voltage to the input circuit and thereby causing a proportional D.C. bias signal to be supplied by the output circuit of the device to the pulse forming network so as to alter the phase of the control signal until the average D.C. value of the output is null, means shifting the phase of the control signal after the null output is obtained until the average D.C. value of the output from the synchronously rectifying means is maximum, means utilizing the amount the reference signal is phase shifted for determining the angular location of the unbalance in the body and the maximum average D.C. value of the output for determining the unbalance in the rotating body.

22. In an unbalance measuring system, the combination of means generating an unbalance signal having the characteristics of unbalance in a rotating body, means generating a reference signal having a frequency corresponding to the rotational speed of the body and also corresponding to the angular disposition of the body, a sawtooth generator triggered by the reference signal so as to provide a relatively constant amplitude sawtooth voltage of a frequency and phase determined by the frequency and phase of the reference signal, a switching circuit having the input thereof operatively connected to the output of the sawtooth generator, means operatively connected to both the output of the sawtooth generator and the switching circuit so as to provide a composite trigger pulse having a phase determined by the bias level of the switching circuit, a square wave generator operatively connected to the switching circuit so as to provide a square wave control signal having a phase and freqeuncy determined by the trigger pulse and that is uninfluenced by variations in the speed of the rotating body, a first synchronous rectifier arranged so as to synchronously rectify the unbalance signal in accordance with the square wave control signal and develop an output determined by the phase relationship between the square wave and the unbalance signals, electronic means responsive to the output from the first synchronous rectifier for controlling the bias level of the sawtooth voltage and accordingly the phase of the trigger pulse until a null average D.C. value of the output from the first synchronous rectifier is obtained, means phase shifting the square wave control signal, a second synchronous rectifier arranged so as to synchronously rectify the unbalance signal in accordance with the phase shifted square wave control signal so as to provide a maximum D.C. average output, and means utilizing the amount the trigger pulse is shifted in phase to produce the null for determining the angular location of the unbalance in a rotating body and the maximum D.C. average output for determining the unbalance in the rotating body.

References Cited by the Examiner

UNITED STATES PATENTS

| | | | |
|---|---|---|---|
| 2,337,932 | 12/1943 | Rogers | 323—119 X |
| 2,405,430 | 8/1946 | Kent | 73—462 |
| 2,451,863 | 10/1948 | Oakley | 73—463 |
| 2,688,721 | 9/1954 | Bixby | 323—119 X |
| 2,730,899 | 1/1956 | Hellar | 73—463 |
| 2,731,835 | 1/1956 | Hellar | 73—463 |
| 2,817,971 | 12/1957 | Gruber | 73—462 |
| 3,017,773 | 1/1962 | Lash | 73—462 |
| 3,020,766 | 2/1962 | Karpchuck | 73—462 |

FOREIGN PATENTS 632,652   11/1949   Great Britain.

RICHARD C. QUEISSER, *Primary Examiner.*

JAMES J. GILL, *Examiner.*